United States Patent [19]
[11] Patent Number: 4,603,970
[45] Date of Patent: Aug. 5, 1986

Aota et al.

[54] APPARATUS FOR INHIBITING COPYING OF CONFIDENTIAL DOCUMENTS

[75] Inventors: Koichi Aota; Katsuhiko Ishikawa; Naoki Yokoi, all of Kanagawa, Japan

[73] Assignee: Fuji Xerox Co., Ltd., Tokyo, Japan

[21] Appl. No.: 509,510

[22] Filed: Jun. 30, 1983

[30] Foreign Application Priority Data

Jul. 9, 1982 [JP] Japan ................................ 57-118672
Jul. 29, 1982 [JP] Japan ................................ 57-131268

[51] Int. Cl.[4] .............................................. G03B 27/52
[52] U.S. Cl. ....................................... 355/133; 355/40
[58] Field of Search .................................. 355/133, 40

[56] References Cited

PUBLICATIONS

IBM Technical Disclosure Bulletin, vol. 18, No. 3, Aug. 1975, pp. 912–913.
IBM Technical Disclosure Bulletin, vol. 15, No. 9, Feb. 1973, pp. 2736–2737.
IBM Technical Disclosure Bulletin, vol. 15, No. 7, Dec. 1972, p. 2231.
IBM Technical Disclosure Bulletin, vol. 19, No. 4, Sep. 1976, pp. 1469–1470.
IBM Technical Disclosure Bulletin, vol. 17, No. 11, Apr. 1975, pp. 3434–3436.

*Primary Examiner*—Monroe H. Hayes
*Attorney, Agent, or Firm*—Sughrue, Mion, Zinn, Macpeak, and Seas

[57] ABSTRACT

An apparatus for inhibiting the copying of confidential documents is disclosed. Confidential documents are treated with an infrared ray-absorbing agent. The apparatus for inhibiting the copying of confidential documents is comprised of a means to detect the presence of the infrared ray-absorbing agent, and a means to stop a copying operation upon detection of the agent or a means to start a control system to make the documents unreadable. Documents may also be provided with a metal layer. The apparatus is then comprised of a means to detect the presence of the metal layer and a means to stop a copying operation or to start a control system adapted to make copied materials undistinguishable or unreadable upon detection of the metal layer.

8 Claims, 14 Drawing Figures

APPARATUS FOR INHIBITING COPYING OF CONFIDENTIAL DOCUMENTS

FIELD OF THE INVENTION

The present invention relates to an apparatus for inhibiting the copying of confidential documents. More particularly, the present invention is concerned with a confidential document copying-inhibiting apparatus which when a confidential document material previously treated with an infrared ray-absorbing agent or metal is passed therethrough, functions to operate a copying control system upon detection of the absorption of infrared ray or the metal so that the copying of the confidential document material can be inhibited.

BACKGROUND OF THE INVENTION

With the development and spread of office copiers or copying machines and facsimile, it has been strongly desired to provide a practical means to inhibit the copying or confidential documents or copyrighted materials without permission.

In order to overcome the foregoing problem, several methods have already been proposed. Among the conventional methods is the one disclosed in U.S. Pat. No. 3,597,082. This method uses a photochromic paper which temporarily changes color to substantially match the color of data during the exposure step of the copying process, preventing the formation of clear copies therefrom. Another method is such that data which must be prevented from being copied are printed on a sheet having a specific background by the use of a specific ink. Image areas printed with the ink are reflective in a certain spectral range and cannot be distinguished from nonimage areas, i.e., the masking background, by a copying machine. On the other hand, within another spectral range, the image areas and nonimage areas are distinguishable from each other. By utilizing the foregoing properties, the method is intended to prevent copying. In accordance with the two methods, copying can be inhibited only when specific types of copying machines are employed; they cannot prevent copying using a so-called white-light copier in which light-sensitive materials coated with zinc oxide are used.

Furthermore, in accordance with the foregoing method, it is necessary to print images using a precisely selected color.

It is therefore desired to develop an apparatus which is not seriously influenced by the color of images, and which makes it possible to prevent copying when using any type of electrostatic copying machine (including the white-light copier) or facsimile.

SUMMARY OF THE INVENTION

The present invention relates to an apparatus for inhibiting the copying of information or data on a manuscript sheet treated with an infrared ray-absorbing agent, which is provided with:

a means to detect the presence of the infrared ray-absorbing agent in the sheet; and a means to stop a copying operation upon detection of the presence of the infrared ray-absorbing agent, or a means to start a control system adapted to make the data undistinguishable or unreadable.

The present invention relates to an apparatus adapted to inhibit the copying of information or data on a support, e.g., a sheet of paper or a film, with a metal layer, which is provided with:

a means to detect the presence of the metal layer; and a means to stop a copying operation upon detection of the metal layer, or a means to start a control system adapted to make the data undistinguishable or unreadable.

According to the present invention, the background of a document material is treated with an infrared ray-absorbing agent by a suitable technique such as printing, coating, and impregnation. A means to detect the infrared ray absorbance of the background following a scanning exposure process of documents during the copying thereof and a means to respond thereto are provided in connection with the copying machine. This response means refers to a means to stop the copying machine and/or a means for sounding an alarm. When the detection of infrared ray absorbance reaches a predetermined level, the control operation starts to run.

Alternatively a document material is treated with metal by a suitable technique such as vacuum deposition, coating, impregnation, and sticking. A means to detect the metal in the document material during a copying process and a means to respond thereto are provided in connection with the copying machine.

This response means refers to a means to stop the copying machine, facsimile, etc., and/or a means to sound an alarm. When the metal in the document material is detected, the control operation starts to run.

Therefor, in order to insure the prevention of copying, it is preferred that the entire background of the documents be treated with an infrared ray-absorbing agent or that the metal treatment be applied on the entire surface of the document material.

DETAILED DESCRIPTION OF THE PREFERRED EMBODIMENTS

Figure 1:
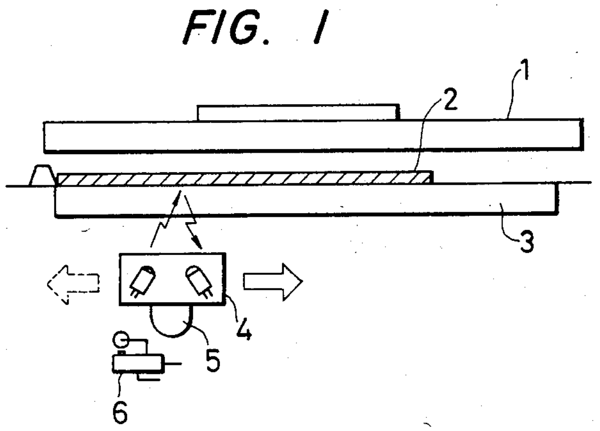
FIG. 1 is a schematic view illustrating the arrangement and location of a sensor in the confidential document copying-inhibiting apparatus of the present invention.

The embodiments of the invention will be described hereunder with reference to the accompanying drawings.

Infrared ray-absorbing agents as used herein are organic compounds having a maximum absorption wavelength of from 0.5 to 3.0μ. Preferred examples are shown below:

(1) Compounds represented by the general formula:

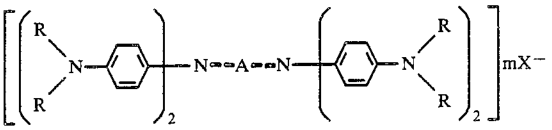

(wherein R is a hydrogen atom, a hydroxyethyl group, a lower alkyl group, or an anion selected from the group consisting of hexafluoroarsenic acid ion, fluoroboric acid ion, perchloric acid ion, hexaflouoroantimonic acid ion, and nitric acid ion, A is

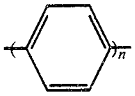 or 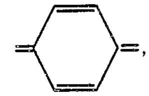

and n is an integer of 1 or 2, provided that when m is 2, A is

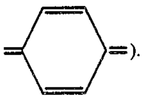).

Specific examples are as follows:

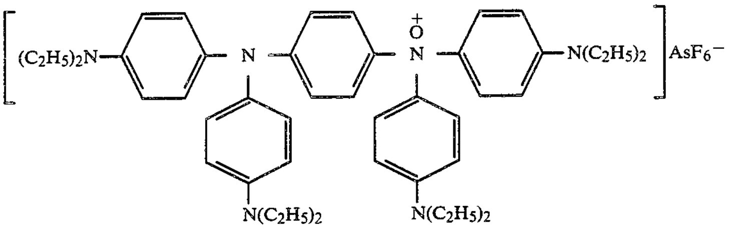
(1)

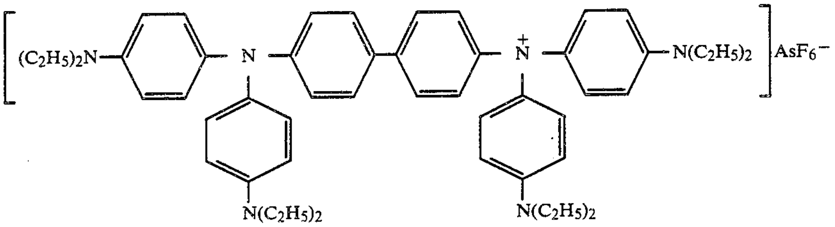
(2)

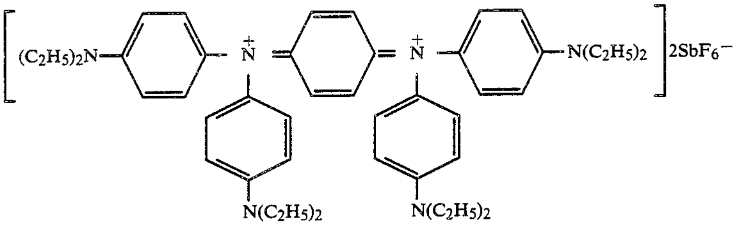
(3)

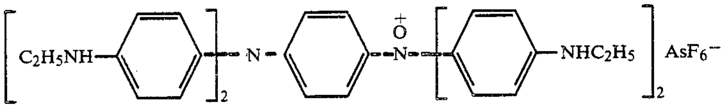
(4)

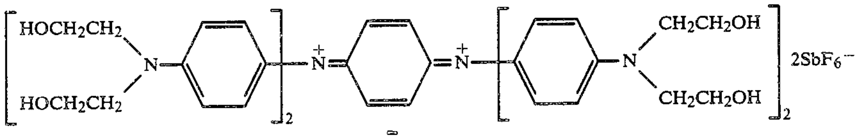
(5)

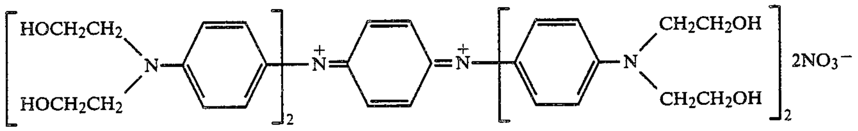
(6)

-continued

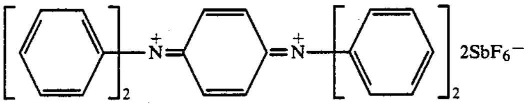

(7)

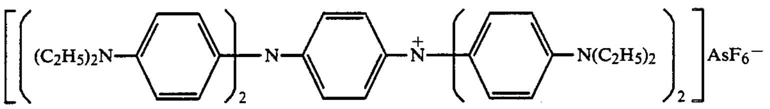

(8)

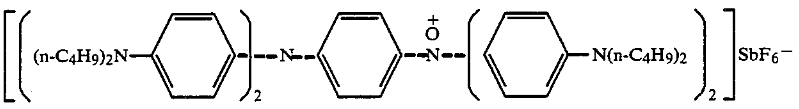

(9)

(2) Compounds represented by the general formula:

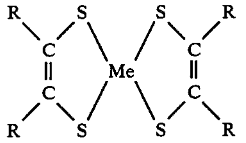

(wherein Me is Ni, Pd, or Pt, and R is a hydrogen atom, a lower alkyl group containing from 1 to 6 carbon atoms, a phenyl group, an alkyl or alkoxy-substituted phenyl group, or a thienyl group).

A specific example is as follows:

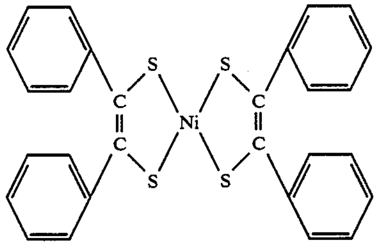

(10)

(3) Compounds represented by the general formula:

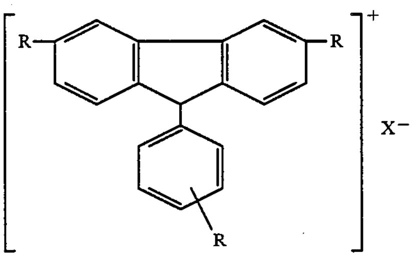

(wherein R is H, $OCH_3$, or a dialkylamino group, and Y is an anion, provided that at least two of Rs are dialkylamino groups, and the 9-phenyl ring may be substituted by alkoxy or halogen as well as R).

A specific example is as follows:

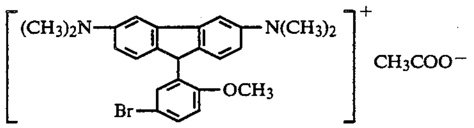

(11)

(4) Compounds represented by the general formula:

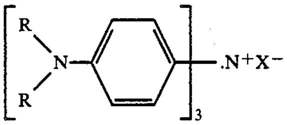

(wherein the two Rs may be the same or different, and are each an alkyl group containing from 1 to 5 carbon atoms (particularly, methyl and ethyl), and $X^-$ is an anion).

Specific examples are as follows:

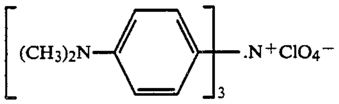

(12)

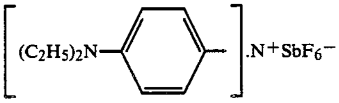

(13)

(5) Others

A manganese complex of 4-hydroxy-3-(2,4-diaminophenylazo)-benzenesulfonic acid, a manganese complex of 4-hydroxy-3-(2-hydroxy-1-naphthylazo)-benzenesulfonic acid, a manganese complex of 4-hydroxy-3-(2-hydroxy-1-naphthylazo)-benzenesulfonic acid, etc. can be used.

In accordance with the present invention, an infrared ray-absorbing agent and an aliphatic compound are mixed with a suitable binder and applied onto the surface of an image-receiving sheet by any suitable known technique such as spraying, electrostatic deposition, dipping, fluid bed coating, and brushing roll coating. Typical examples of such binders are acetylated starch, polystyrene, polybutadiene latex, carboxymethyl cellulose, polyvinyl pyrrolidone, acryl latex, vinyl acetate copolymer, polyvinyl alcohol, and soy sauce protein.

A process for the production of copying-inhibiting manuscript sheets is hereinafter explained by reference to the following examples.

EXAMPLE 1

A mixture of 10 parts by weight of a 4-hydroxy-3-(2,4-diaminophenylazo)benzenesulfonic acid manganese complex as an infrared ray-absorbing agent, 10 parts by weight of a 10% aqueous polyvinyl alcohol solution, and 30 parts by weight of water was ground in a ball mill for 24 hours.

To the thus-ground mixture was added 6 parts by weight of acetylated starch as a binder, and the resulting mixture was coated on a commercially available high quality paper having a basis weight of 64 $g/m^2$ by means of an air knife coater in a dry coating amount of 2 g per square meter and dried. Using the above-prepared sheet, copying was conducted by the use of Xerox Copier (FX-4600) to obtain a copying-inhibiting manuscript.

EXAMPLE 2

A pulp mixture consisting of 20% by weight of needle leaf tree pulp and 80% by weight of broadleaf tree pulp was beaten by means of a pulper, a refiner, and a Jordan engine to the extent that the freeness (C.S.F.) was 350 ml. To the resulting pulp mixture were added 1.5% by weight of a rosin size, 0.5% by weight of alumina sulfate, 0.4% by weight of polyacrylamide, and 8% by weight of talc to prepare a paper material. This paper material was processed by means of a Fourdrinier paper machine. As a sizing agent, a mixture of 0.5% by weight of polyvinyl alcohol (PVA), 0.7% by weight of oxidized starch, 0.4% by weight of the ground mixture obtained in Example 1, and 98.4% by weight of water was coated on the above-prepared paper by a size press process in a dry amount of about 2.0 $g/m^2$ and dried. Using the thus-prepared sheet, copying was conducted by the use of Xerox Copier (FX-2830) to obtain a copying-inhibiting manuscript.

EXAMPLES 3 TO 7

In these examples. the types of the infrared ray-absorbing agent and binder were changed, and either by means of an air knife coater or by the size press process, manuscript sheets were produced.

| Example | Infrared Ray-Absorbing Agent | Binder | Coating Procedure |
|---|---|---|---|
| 3 | Compound of Formula (8) | Hydroxyethyl Cellulose | Air Knife |
| 4 | Compound of Formula (9) | Oxidized Starch | Size press |
| 5 | Compound of Formula (10) | Styrene-maleic acid copolymer | Air knife |
| 6 | Compound of Formula (12) | PVA | Size press |
| 7 | Compound of Formula (13) | Acetylated starch | Size press |

The confidential document copying-inhibiting apparatus of the present invention wherein the manuscripts described above are employed will hereinafter be explained in greater detail by reference to the accompanying drawings (FIGS. 1 to 7). However, the scope of the invention is not limited to the examples shown in these drawings.

Figure 2:
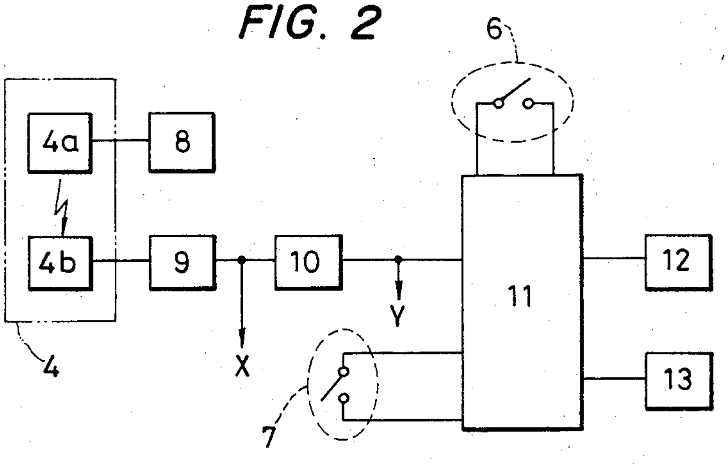
FIG. 2 is a block diagram of an example of the present invention.

The apparatus of the present invention, as illustrated in FIGS. 1 and 2, comprises a sensor 4 disposed so that it can examine the light reflective state of a manuscript 2 prepared using a sheet treated with an infrared ray-absorbing agent through a platen glass 3. The apparatus further includes a microswitch 6 to detect the position of the sensor 4, a display means to indicate that copying is impossible, a print start switch 7, a microswitch 6 for detecting a standard position a driving circuit 8 for a light emitting portion, an amplification circuit 9, a comparison circuit 10, a control circuit 11, and an exposure device and/or a sheet feeding device 13. Furthermore, 1 designates a manuscript cover.

Figure 3:
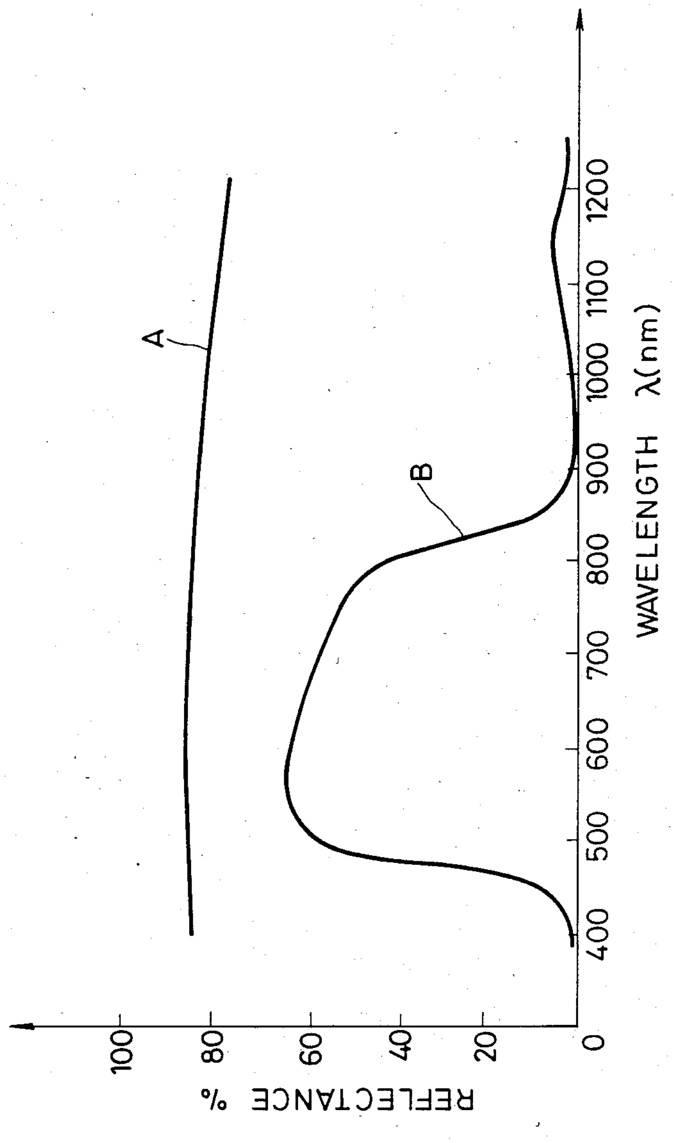
FIG. 3 is a graph showing the reflectance of a manuscript.

In the present invention, there is used a manuscript having a reflectance as shown by B in FIG. 3, which is prepared by treating with as infrared ray-absorbing agent as described hereinbefore.

Figure 4:
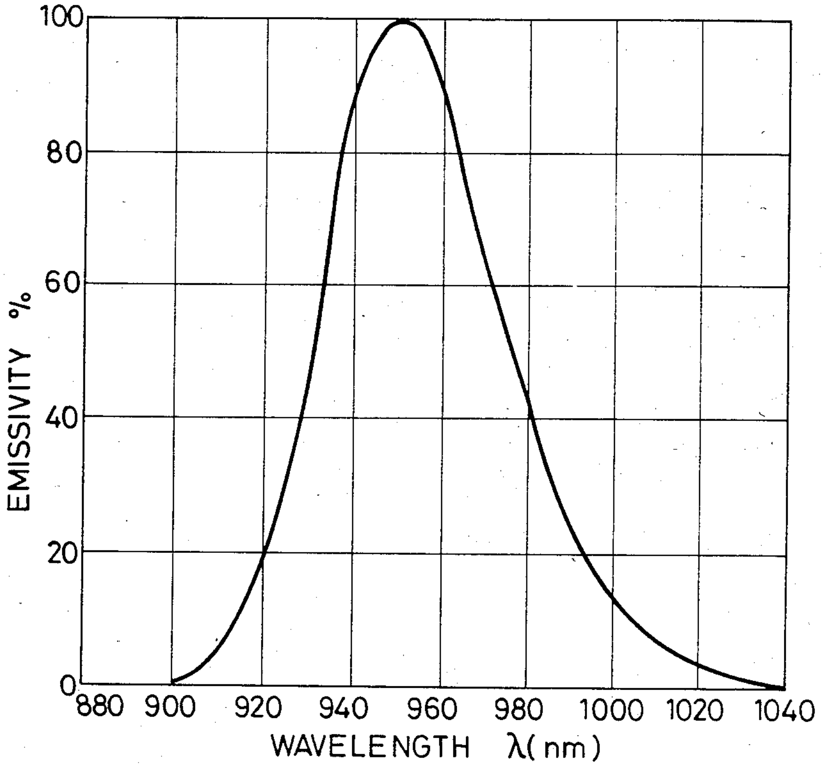
FIG. 4 is a graph showing an emission wavelength of a sensor.

An untreated manuscript and a manuscript subjected to a treatment using an infrared ray-absorbing agent has a different light reflectance with respect to a specific wavelength of light. That is, the usual manuscript has a flat reflectance characteristic in a range of from visible light to near infrared light as shown by A in FIG. 3, whereas for the manuscript of the present invention, as shown by B, the reflectance is lower in a range of from 850 mm to near infrared light than in a visible light range. Utilizing the foregoing characteristics, the manuscript is examined and determined by means of a reflection type light sensor 4 using near infrared light having a wavelength of at least 850 mm, which is capable of amplifying the difference in reflectance. The emission wavelength of an emission part 4*a* of the sensor 4 is shown in FIG. 4.

The reflectance with regard to the position between the sensor 4 and the microswitch 6 is as shown in FIG. 1.

Figure 7:
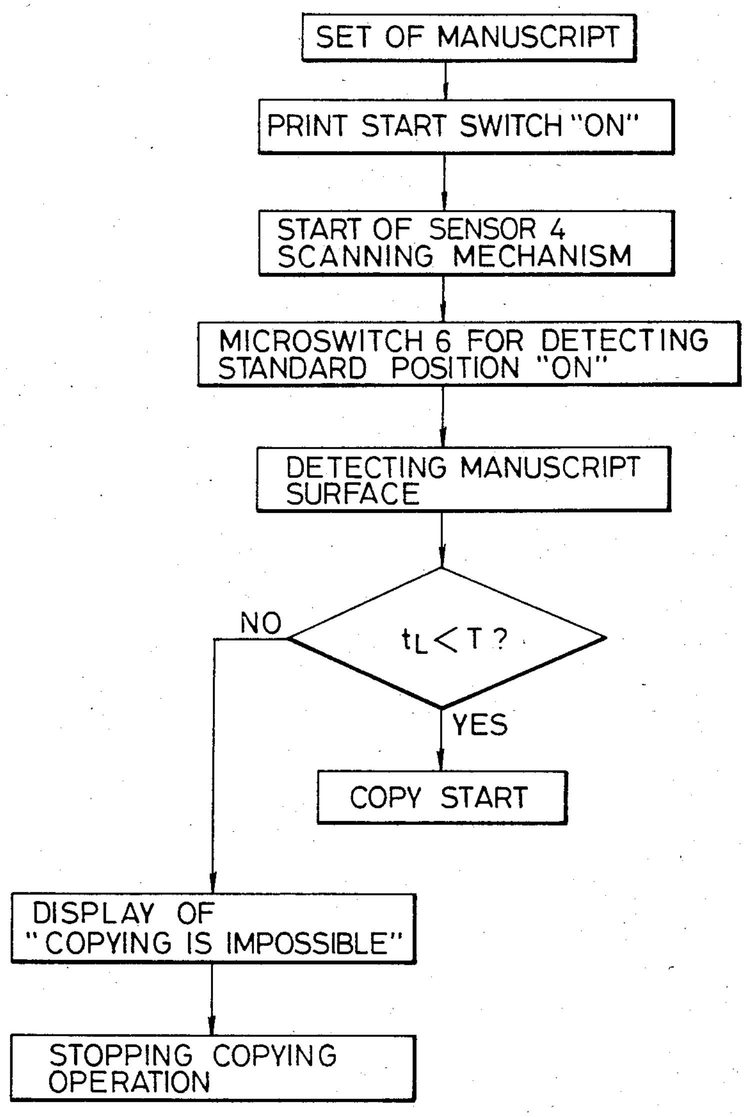
FIG. 7 is a flow chart illustrating the operation of the apparatus of the present invention.

The operation of an example of the present apparatus will hereinafter be explained by reference to the flow chart of FIG. 7.

When the manuscript 2 is placed on the platen glass 3 and a print start switch 7 is turned "on", only the scanning mechanism of the reflection type sensor moves as shown by the arrow in FIG. 1. A cam 5 makes the microswitch 6 turn "on" for detecting the basic position, which is located near the top of the manuscript, and the manuscript-detecting mechanism begins to work.

For the microswitch 6 as used in detecting the location of the sensor 4, there may be used other mechanisms, such as a photoelectric switch and a magnetic sensor, which can be used in detecting the position. The scanning mechanism of the sensor 4 may be shared with the optical scanning mechanism of, e.g., an exposure lamp.

Figure 5:
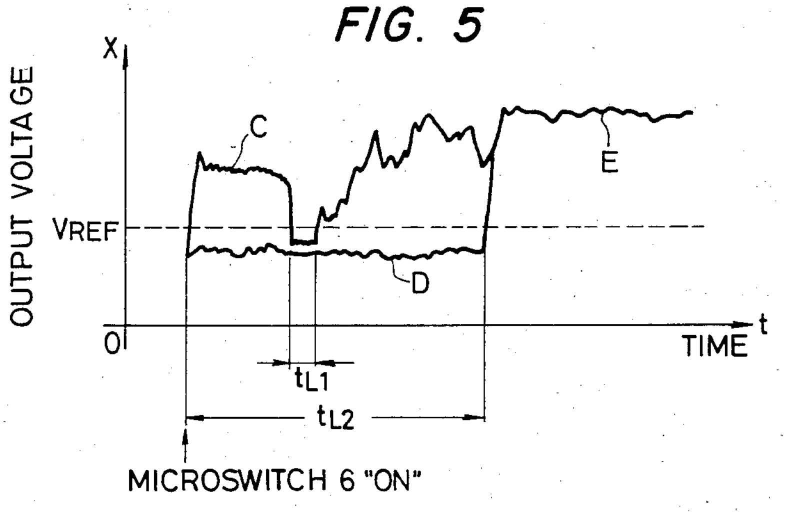
FIG. 5 is a waveform after amplification of a sensor output.

The output voltage, X, of an amplification circuit 9 to amplify the output of a light-receiving element 46 of the sensor 4 is shown in FIG. 5. With the usual manuscript, since the reflectance is high at white areas, the output voltage is high, and there is obtained an output curve as indicated by C in which the output voltage is low at image areas.

Figure 6A:
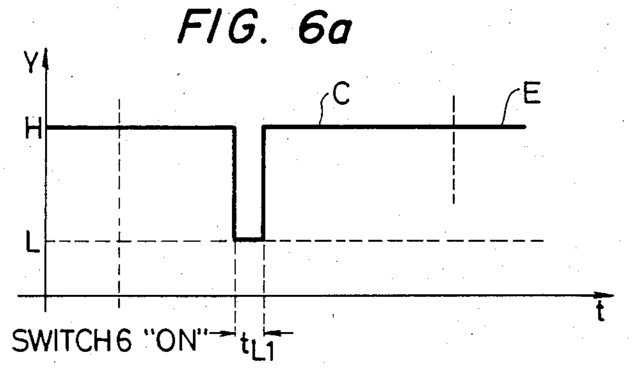
FIGS. 6*a* and 6*b* are each a wave form of a comparative circuit output.
Figure 6B:
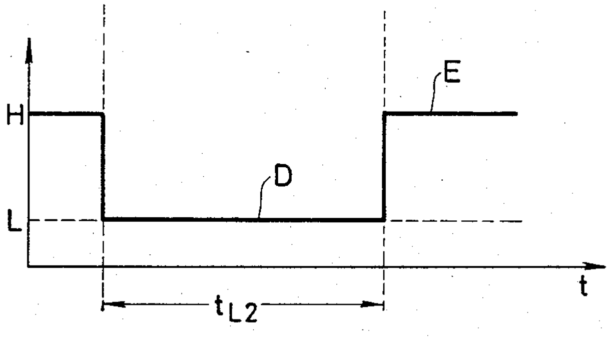

The range indicated by E shows that there is no manuscript and the white areas of the manuscript cover 1 are directly detected. Therefore, the output, Y, of a comparative circuit after being divided by a reference voltage $V_{REF}$ as indicated by the dotted line is as shown in FIGS. 6*a* and 6*b*, and there is obtained a time, $t_L$, ($t_{L1}$ or $t_{L2}$) against the L level. FIG. 6*a* corresponds to Curves C and E in FIG. 5, and FIG. 6*b* corresponds to Curves D and E in FIG. 5. Comparing $t_L$ with the reference time T previously determined from the scanning speed of the sensor 4 and the size of the manuscript in the control circuit 11, if $t_L<T$, i.e., the black area is small, normal copying can be conducted. On the other hand, if $t_L \geqq T$, the manuscript is deemed as a manuscript treated with an infrared ray-absorbing agent, and the copying operation is prevented from starting while indicating that "copying is impossible".

Other procedures to prevent the copying operation, include the use of a method in which the discharge of the charge transfer corotron is turned "off" or the exposure lamp is turned "off", whereby although the copying operation is allowed to run, copied materials are made undistinguishable or unreadable.

The infrared ray-absorbing agent-treated sheet is obtained by treating a support, such as a sheet of paper, or a plastic film, with an infrared ray-absorbing agent by impregnation, mixing or coating.

As described above, the confidential document copying-inhibiting apparatus of the present invention detects the infrared ray absorbance of a manuscript, said manuscript being prepared using a sheet treated with an infrared ray-absorbing agent, thereby judging if the manuscript is confidential, and on the basis of such a judgement, functions to inhibit the copying operation or to make copied material unreadable.

The apparatus of this embodiment has advantages in that by optionally setting the reference voltage $V_{REF}$ and the reference time T, erroneous detection can be avoided; many kinds of manuscripts can be copied; since the copying operation starts after determining if the manuscript is confidential, papers are not wasted; and in that the indication of e.g., "copying is impossible", avoids confusion resulting from other troubles.

A second embodiment using metals which are employed in copying-inhibiting manuscript sheets of the invention will be described in detail with reference to FIGS. 8 through 13. However, the scope of the invention is not limited to the examples shown in these drawings.

Figure 8:
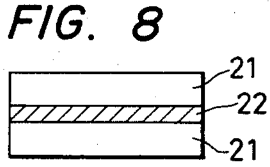
FIG. 8 is a cross-sectional view of an example of a copying-inhibiting document material for use in the apparatus of the present invention.
Figure 9:
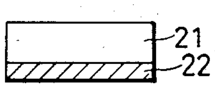
FIG. 9 is a cross-sectional view of another example of a copying-inhibiting document material for use in the apparatus of the present invention.

Metals which are used in copying-inhibiting manuscript sheets according to the present invention include aluminum, iron, brass, and stainless steel. The most typical structure of the copying-inhibiting manuscript sheet is shown in FIG. 8 which comprises a sheet 21, e.g., a high quality paper, a white roll paper, or a plastic film, and a metal thin film layer or metal vacuum-deposited layer 22, e.g., aluminum. The thickness of the metal layer 22 is several angstroms to about 100 microns. The sheet 21 and the metal layer 22 are bonded together with a binder, an adhesive, or by means of vacuum deposition. The metal layer 22 may be provided only on one side of the sheet 21, producing a two-layer sturucture as shown in FIG. 9.

Figure 10:
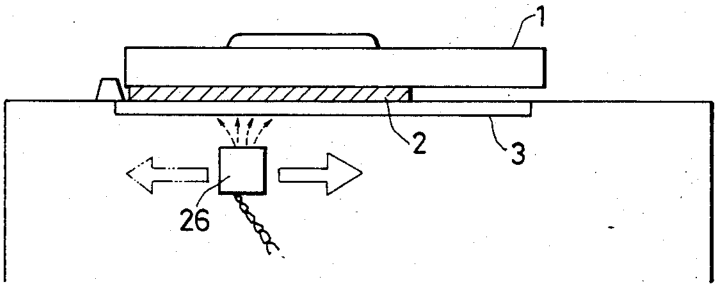
FIG. 10 is a schematic diagram of a detection system for the apparatus of the present invention.
Figure 11:
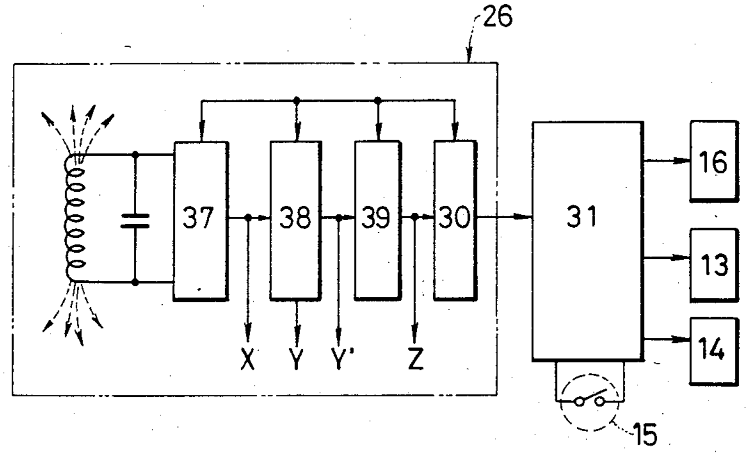
FIG. 11 is a block diagram of an example of the present invention.

FIG. 10 shows a schematic diagram of the apparatus of the present invention, and FIG. 11 shows a block diagram of an embodiment of the apparatus of the present invention. FIGS. 10 and 11 show that the apparatus comprises a proximity detector 26 disposed so as to be capable of detecting the metal layer of a manuscript sheet 2 through a platen glass 3 and an indication-alarm device 16 indicating that copying is impossible. The proximity detector 26 is substantially composed of a coil means, a capacitor means, an oscillation circuit 37, a detecting circuit 38, a Schmitt circuit 39, and a power circuit and output circuit 30. In FIG. 11, reference numeral 16 designates an indication-alarm device, 13 an exposure device, 14 a paper feeding device, and 15 a start print switch.

The proximity detector 26 can detect all types of metals without directly contacting the metal by utilizing a change in impedance of an oscillation coil of a high frequency osicillation circuit due to eddy current loss. The internal structure, etc. of the proximity detector 6 is well known in the art and no detail description thereof is deemed necessary for a full understanding of this embodiment of the invention.

In accordance with the present invention, when an attempt is made to copy confidential documents prepared by printing or writing on copying-inhibiting manuscript sheets with a metal layer as described above, the proximity detector 26 detects the presence of metal. This functions to turn on the indication-alarm device 16, thereby inhibiting the copying of the confidential documents.

Figure 13:
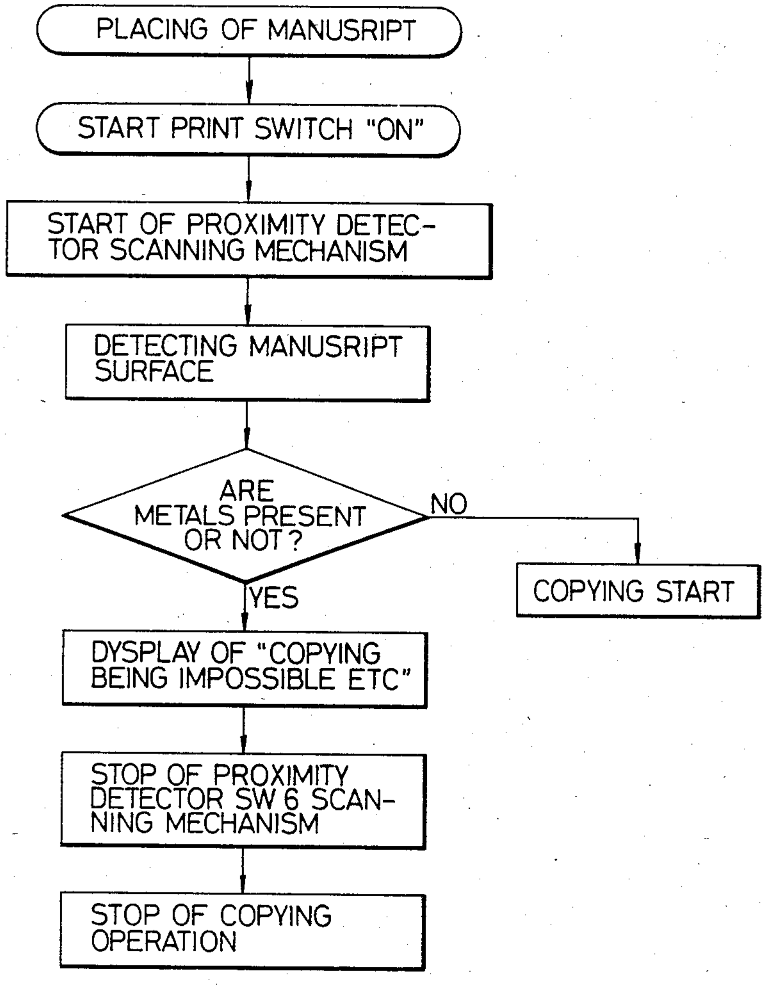
FIG. 13 is a flow diagram illustrating the operation of the apparatus of the present invention.

The operation of this embodiment of the present invention will hereinafter be described by reference to the flow diagram shown in FIG. 13. However, the scope of the invention is limited only to the disclosed example. When the manuscript 2 is placed on the platen glass 3 of the copying machine and a start print switch 15 is set to "ON", only the scanning mechanism of the proximity detector 26 works, examining the surface of the manuscript 2. In order to prevent erroneous operation, it is desirable that no metallic part be provided in the vicinity of the area wherein the proximity detector 26 moves, not to mention within the movement area.

Figure 12:
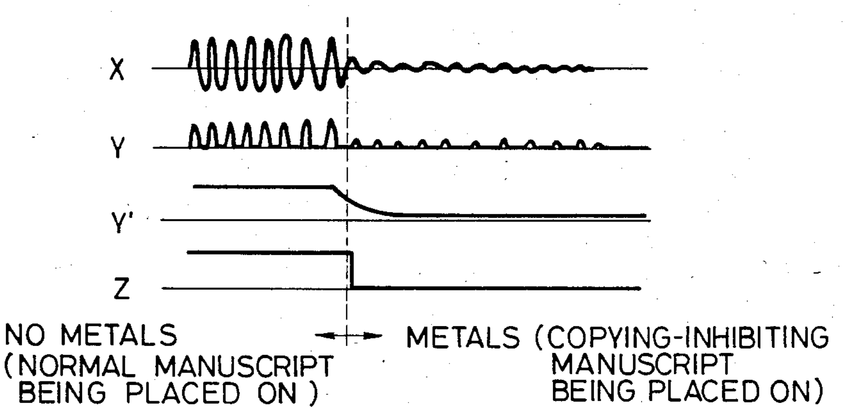
FIG. 12 shows signal waveforms in the interior of an adjacent detector.

If the proximity detector does not detect the metal layer, copying is conducted as in the usual copying machine. In the case of a copying-inhibiting manuscript sheet with a metal layer, the proximity detector 26 changes signals as shown in FIG. 12, sending a signal indicating the presence of the metal layer to a control circuit 31. This signal produces an indication or alarm showing that "copying is impossible". Therefor, the copying operation is stopped or some suitable procedure is taken to inhibit normal copying.

Procedures which can be employed to stop the copying operation include a method in which discharge of a charge transfer corotron is turned "off", or an exposure lamp is turned "off", so that although the copying operation is conducted, copied materials cannot be read or are not distinguishable. The scanning mechanism of the proximity detector may be shared with an optical scanning mechanism, e.g., an exposure lamp.

The scanning mechanism of the proximity detector 26 is not needed for copying machines of the type that a manuscript-mounting base (a platen glass) moves.

The indication or alarm, e.g., "copying is impossible", may be omitted depending on the purpose.

As described above, the confidential document copying-inhibiting apparatus of this embodiment detects the presence of metal in confidential documents and, upon detection of the metal, functions to inhibit the copying operation or to make copied materials unreadable.

The apparatus of the present invention has advantages in that for kinds of manuscripts not having a metal layer can be copied in the same way as with the usual copying machine. Further, since the invention works to copy after detecting the presence of metal and judging if the document is confidential, papers, etc. are not wasted; the indication or alarm that "copying is impossible" avoids confusion resulting from other troubles; and the detecting system can be simplified by omitting the scanning mechanism, the indication device, etc. of the proximity detector 26, which will lead to a reduction of the production cost of the apparatus.

While the invention has been described in detail and with reference to specific embodiments thereof, it will be apparent to one skilled in the art that various changes and modifications can be made therein without departing from the spirit and scope thereof.

What is claimed is:

1. An apparatus for inhibiting the copying of information on a manuscript sheet treated with an infrared ray-absorbing agent, said apparatus comprising:

scanning means for scanning said sheet for infrared ray-absorbing regions;

comparison means for comparing an output of said scanning means to a reference level; and means responsive to an output of said comparison means for determining the size of detected infrared ray-absorbing regions and for preventing the copying of the information upon the detection of the presence of an infrared ray-absorbing region greater than a predetermined size.

2. An apparatus as claimed in claim 1, wherein said comparison means provides an infrared absorption detection signal for each detected infrared ray-absorbing region having a duration corresponding to the size of said each region, and wherein said means for preventing copying prevents the copying of information only when the duration of an infrared absorption signal exceeds a predetermined time interval.

3. An apparatus as claimed in claim 1, wherein said apparatus includes only a single scanning means.

4. An apparatus as claimed in claim 1, wherein said scanning means provides an output representing an infrared ray-absorbing region upon encountering said infrared ray-absorbing agent or upon encountering information on said manuscript sheet.

5. An apparatus as claimed in claim 1, wherein the means to prevent copying is a means for stopping a copying operation upon detection of the presence of the infrared ray-absorbing agent.

6. An apparatus as claimed in claim 1, wherein the means to prevent copying is a means to start a control system adapted to make any information on the manuscript sheet which is copied unreadable.

7. An apparatus as claimed in claim 6, wherein the means to start a control system adapted to make the information unreadable is a means to turn off the discharge of a charge transfer corotron.

8. An apparatus as claimed in claim 6, wherein the means to start a control system adapted to make the data unreadable is a means to turn off an exposure lamp.

* * * * *